2 Sheets—Sheet 1.

V. P. KIMBALL.
Grain-Cutting Machine.

No. 203,348. Patented May 7, 1878.

WITNESSES
Edn. S. Nottingham
A. W. Bright.

INVENTOR
Volney P. Kimball,
By H. A. Seymour,
ATTORNEY

2 Sheets—Sheet 2

V. P. KIMBALL.
Grain-Cutting Machine.

No. 203,348. Patented May 7, 1878.

WITNESSES
Ed. J. Nottingham
A. W. Bright.

INVENTOR
Volney P. Kimball.
By H. A. Seymour.
ATTORNEY

N. PETERS, PHOTO-LITHOGRAPHER, WASHINGTON, D. C.

UNITED STATES PATENT OFFICE.

VOLNEY P. KIMBALL, OF WATERTOWN, NEW YORK.

IMPROVEMENT IN GRAIN-CUTTING MACHINES.

Specification forming part of Letters Patent No. 203,348, dated May 7, 1878; application filed March 15, 1878.

*To all whom it may concern:*

Be it known that I, VOLNEY P. KIMBALL, of Watertown, in the county of Jefferson and State of New York, have invented certain new and useful Improvements in Grain-Cutting Machines; and I do hereby declare the following to be a full, clear, and exact description of the invention, such as will enable others skilled in the art to which it pertains to make and use it, reference being had to the accompanying drawings, which form part of this specification.

My invention is designed more especially as an oat-cutting machine; and consists in a construction of the following character.

The feed-plate is formed with a series of openings, which radiate from its central portion, and which are made bevel-shaped in their entire transverse section, so as to allow the grain to pass endwise through said openings.

The cutting mechanism consists of a disk cutter-head, adapted to be revolved in horizontal plane below the said feed-plate, and is formed with a system of radial knives, corresponding to the radial openings of the feed-plate. This cutter-head works in a cutting-chamber formed with an annular recess or channel, which is in a circular plane exterior to the vertical side of the cutter-head, and which is provided with a feed-discharge opening. Secured to said cutter-head are two fan-shaped arms, which revolve therewith, and operate to provide a clearing of the cutting-chamber from the cut grain. They serve to create a suction-blast in the machine, so as to draw the grain from the cutter-head down into the annular channel, and thence out through the discharge-opening. This revolving system of radial knives is adapted to be adjusted vertically, so as to allow them to be brought nearer to or farther from the feed-plate, as may in any instance be desired. For this purpose the supporting-spindle of the cutter-head is stepped in a foot-block, which has a horizontal slot made in its central body, and connecting with the vertical slot in which the spindle is supported. This horizontal slot is made of varying vertical section, so as to allow free play for the lever, which latter works therein and provides end bearing for the spindle.

Figure 1:
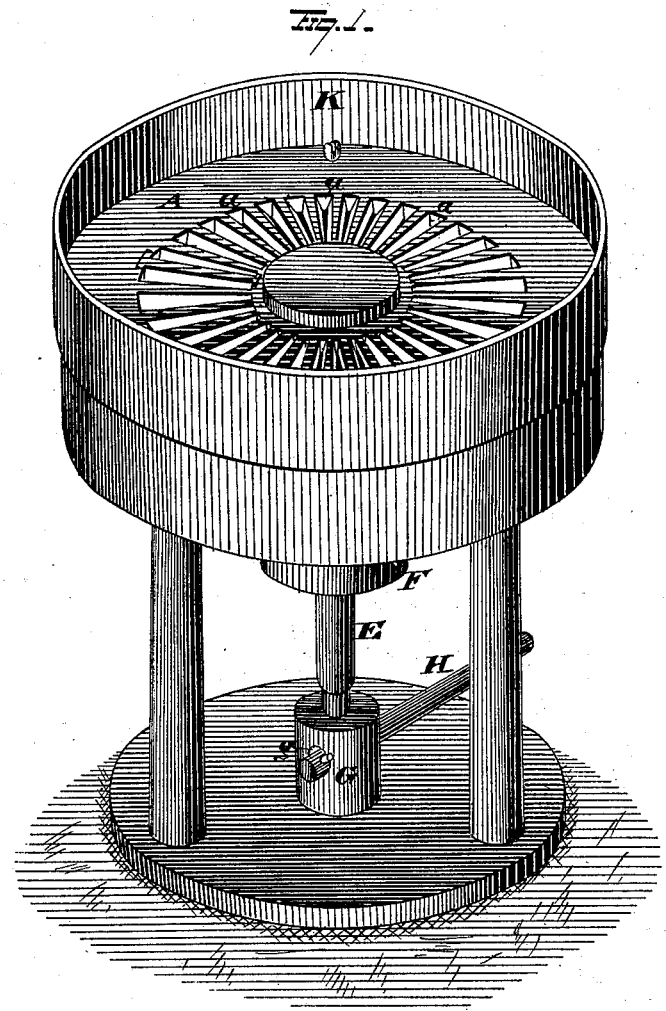
Figure 2:
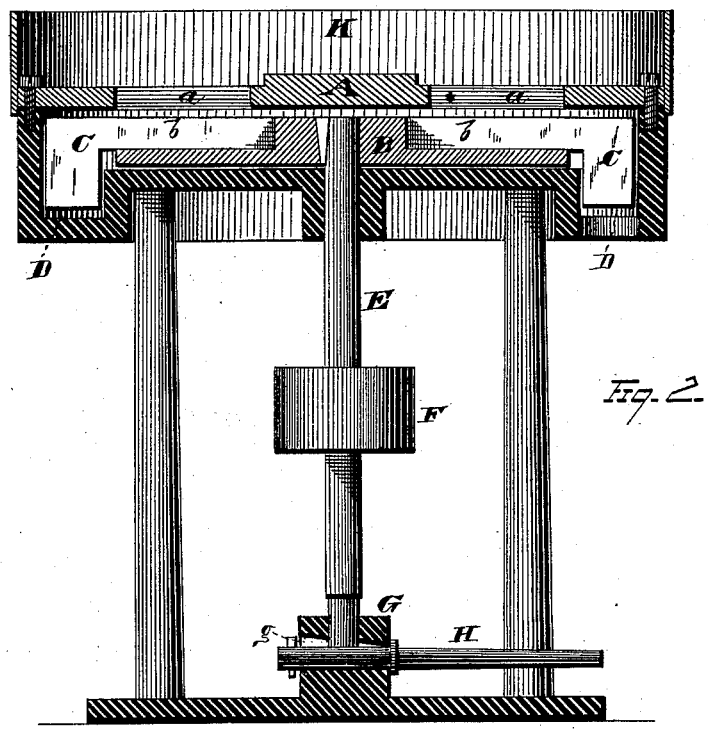
Figure 3:
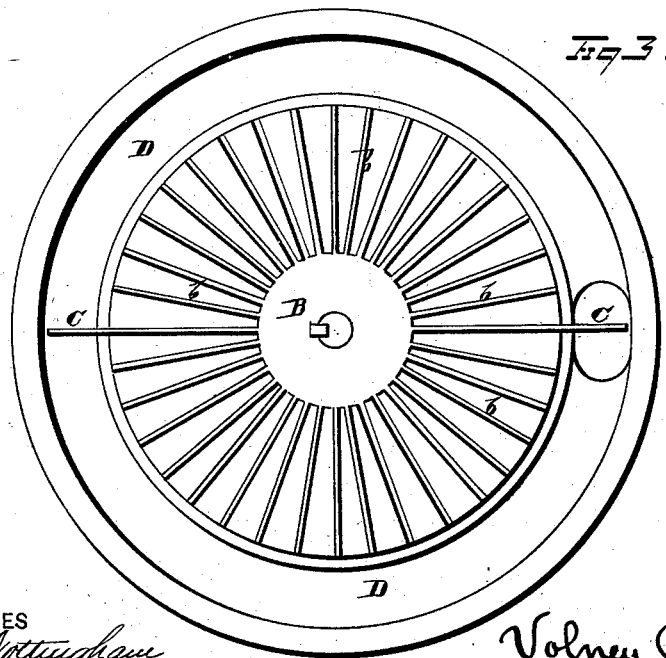

Referring to the drawings, Figure 1 is a view, in perspective, of a machine embodying my invention. Fig. 2 is a vertical central section of the same. Fig. 3 is a top view of the machine with the feed-plate removed.

The plate A is made with the feed-openings *a*, formed radiating from its central portion, and of bevel shape in their entire transverse section, so as to allow the grain to naturally assume an endwise position as the same passes through said openings and is presented to the knife action below. The cutter-head B is formed disk-shaped, and with a system of radial knives, *b*, corresponding to the openings of the feed-plate. Secured to this cutter-head, or to any of the knives thereon, are the two fan-shaped arms C, which are carried in revolution thereby, and which work in the annular channel or recess D, which is formed in a circular plane of the cutting-chamber, exterior to the vertical side of the cutter-head.

The spindle E, which supports the cutter-head, may be revolved by any suitable actuating means, and for this purpose is provided with the band-pulley F. It is stepped in the foot-block G, which latter is provided with the horizontal slot *g*, having its vertical section of varying height, so as to allow of the proper movement of lever H therein. As this lever-slot *g* is formed in the horizontal central body of the foot-block, and connects with the vertical central slot which supports the spindle, the lever provides end bearing for the latter.

By adjusting the free end of the lever, that portion of the latter upon which the spindle rests serves to raise or lower the said spindle, together with its cutter-head, and the revolving system of radial knives is correspondingly brought nearer to or removed farther from the feed-plate, as the case may be.

Any suitable means may be provided for retaining the grain upon the machine, and preferably I use an annular guard, K, which is made separate from the feed-plate, and fits over the edge of the same.

If desirable, the fans or fan-shaped arms may be omitted from the machine, and the latter made without the same.

Having fully described my invention, what I claim as new, and desire to secure by Letters Patent, is—

1. The combination, with the feed-plate and the revolving system of knives, of the fan-shaped arms, adapted to revolve in a recess or channel of the cutting-chamber, which is formed in a circular plane about the vertical side of the cutter-head, substantially as set forth.

2. The combination, with a feed-plate formed with any number of radial openings, of a system of radial knives located below said feed-plate, and adapted to be revolved in close proximity thereto, substantially as set forth.

3. The combination, with a feed-plate formed with any desired number of bevel-shaped radial openings, of a system of radial knives located below said feed-plate, said knives being secured to a vertically-adjustable spindle, substantially as set forth.

4. The combination, with a stationary feed-plate formed with any desired number of bevel-shaped radial openings, of a guard-plate removably secured thereto, a system of radial knives located below said feed-plate, and one or more fans adapted to revolve within the cutting-chamber, substantially as set forth.

5. The combination, with the system of knives adapted to be revolved about its vertical central axis, of the feed-plate located above the same, and formed with the radial openings, made bevel-shaped in their entire transverse section, substantially as set forth.

6. The combination, with the feed-plate having the bevel-shaped radial openings and the revolving system of knives, of the fan or fans adapted to revolve within the cutting-chamber, substantially as set forth.

In testimony that I claim the foregoing I have hereunto set my hand this 9th day of March, 1878.

VOLNEY P. KIMBALL.

Witnesses:
  FRED EMERSON,
  L. D. MORGAN.